Dec. 6, 1932.  J. W. LEDOUX  1,889,994
METER
Filed Dec. 22, 1928
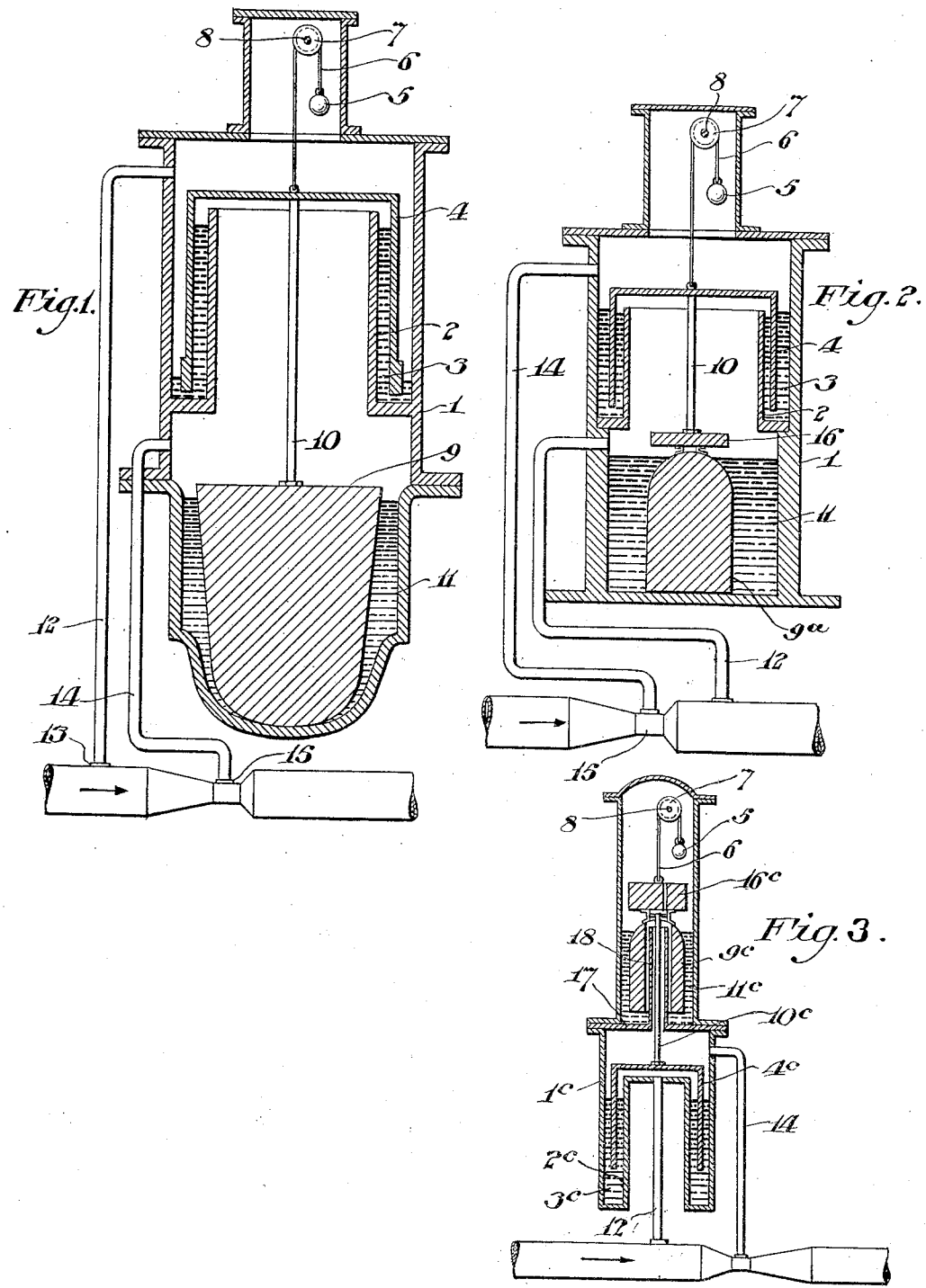
Inventor
John W. Ledoux,
By [signature]
Attorney Patented Dec. 6, 1932

1,889,994

UNITED STATES PATENT OFFICE

JOHN W. LEDOUX, OF SWARTHMORE, PENNSYLVANIA

METER

Application filed December 22, 1928. Serial No. 327,849.

My invention is an improved meter mechanism for measuring the flow of either gases or liquids. It involves controlling the movements of a hollow device sealed by a pool of liquid by varying the displacement of a second liquid independent of the first by means of a displacing device which, in its datum position, tapers toward the normal surface of such second liquid.

The movements of the hollow device result from differential pressures communicated thereto from a flowing stream and when uncontrolled are proportional to the head inducing flow. The displacements of liquid by the displacing device are proportional to the exponential functional relation between the head and the volume or velocity of the flowing fluid. Consequently the actual movements imparted to the hollow device by the opposing forces acting thereon are in direct proportion to changes in the velocity or volume of the fluid being measured.

The variations in the displacement of the displaced liquid may be effected by any relative movement of the fluid container and displacing device. The immersion of the displacing device may be either increased or decreased upon movement of the hollow device from its datum or "no flow" position depending upon whether the higher pressure zone of the flowing fluid acts to move the hollow device upward or downward. The displacing device, in its datum position, tapers toward the surface of the liquid in such position regardless of whether the displacing device is submerged in or above the fluid in such datum position, and the taper of the displacing device is such as to vary the fluid displacement proportionately to the functional relation between the head and the volume of the measured fluid.

Illustrative embodiments of apparatus embodying my improvements are shown in the accompanying drawing in which Fig. 1 is a diagrammatic vertical sectional view of one embodiment of my improved apparatus; Fig. 2 is diagrammatic vertical sectional view of a second form of my improved apparatus; and Fig. 3 is a diagrammatic vertical sectional view of a further embodiment of my invention.

As illustrated in Fig. 1, a casing 1 contains a partition 2 forming a channel containing a liquid 3 heavier than that to be measured, as for instance, mercury. A hollow device such as a hood 4 has its lower edge immersed in and sealed by the mercury 3. The lower edge of the hood 4 may be thickened to increase the buoyancy thereof and if necessary the weight of the hood 4 may be wholly or partially counterbalanced by a weight 5 depending from a tension member or cord 6 connected with the hood and passing over the sheave 7 fixed on the rotatable shaft 8. A displacing device 9 is connected with the hood 4 by a rod or compression member 10 and is movable by the movements of the hood 4 into and out of a pool of liquid 11 in the bottom of the casing 1, such liquid being heavier than that to be measured and preferably mercury.

The device 9 has its external surface tapered downwardly so that its immersion in the liquid 11 displaces such liquid and interposes a resistance to movement of the members 9 and 4 proportionately to the functional relation between the volume and differential pressures of a fluid to be measured. Such differential pressures may be communicated to the casing 1 on opposite sides of the hood 4 by a pipe 12 connected with a normal section 13 of a conduit and by a pipe 14 connected with a contracted throat 15 of a Venturi tube in the conduit.

The parts are shown in Fig. 1 in the position occupied thereby when there is maximum flow in the conduit. When there is no flow in the conduit, the pressures communicated to the casing 1 by the pipes 12 and 14 are equal, and consequently the hood 4 stands in its topmost position and the bottom of the device 9 just touches and is tangent to the normal surface of the pool 11.

As the flow in the conduit increases, the pressure communicated through the pipe 14 decreases much more rapidly than the decrease in pressure through the pipe 12, and consequently the hood 4 is forced downward carrying with it the device 9, which by reason of its taper interposes a constantly increasing resistance to immersion in the pool 11 proportional to the functional relation between the differential pressure and the volume or velocity of fluid in the conduit. Consequently the resultant of the forces acting oppositely upon the parts 4 and 9 is a movement of such parts in direct proportion to changes in the velocity or volume of flow. Such movement may be communicated in any desired manner to indicating, registering and recording mechanisms, as for instance, by connecting such mechanisms with the projecting end of the shaft 9 as illustrated in my Patents Nos. 1,064,748 and 1,129,209.

By having the displacing device at a different vertical level from the hood 4, I am enabled to use a displacing device of large diameter and consequently short length without unduly increasing the diameter of the instrument as a whole.

As illustrated in Fig. 2 the pipe 12 connects a normal section of the conduit with the casing 1 beneath the hood 4 and the pipe 14 connects the contracted throat 15 of a Venturi tube in the conduit with the casing 1 above the hood 4.

The hood has depending therefrom on the rod 10 a displacing device 9a which by its own weight and the weight 16 is normally submerged in the pool 11 and holds the hood 4 in its lowermost position in the mercury 3 when there is no flow in the conduit and the pressures communicated by the pipes 12 and 14 are consequently equal.

The exterior surface of the device 9a, when in the datum position, tapers toward the normal surface of the fluid 11, and consequently its emersion from the fluid 11 opposes a gradually increasing resistance to the rise of the parts 4 and 9a when the increase in flow through the conduit results in the communication of greater pressure through the pipe 12 than through the pipe 14. Consequently the resultant of the forces acting upon the parts 4 and 9a is a movement thereof directly proportional to changes in the volume or velocity of flow in the conduit, which movements may be communicated to indicating and recording mechanism as above described.

In the form of the device illustrated in Fig. 3 a casing 1c has formed therein a channel 2c containing the mercury 3c which forms a seal for the hollow hood 4c. The hood 4c is pressed toward its lowermost position by a displacing device 9c and weight 16c which are connected with the hood by a compression rod 10c.

The displacing device 9c is normally submerged in a pool of mercury 11c contained in a reservoir formed by the insertion in the casing 1c of a wall 17 having an upwardly projecting tube 18 fixed therein through which the rod 10c freely reciprocates. A cord 6 having a counterweight 5 thereon is connected with the weight 16c and passes over the sheave 7 to communicate movement to a shaft 8 which may be connected with suitable indicating, registering and recording mechanism. A displacing device 9c is so tapered toward the surface of the liquid 11c when in its datum position that the emersion thereof varies the displacement of the mercury 11c in proportion to the functional relation between the head and velocity or volume of a flowing fluid. The differential pressures of such flowing fluid, which are proportional to the head, are communicated to the casing 1c within and without the hood by a pipe 12, connected with a normal section of the conduit, and by a pipe 14 connected with the contracted throat of a Venturi tube in the conduit containing the flowing fluid.

When there is no flow in the conduit, the pressures communicated through the pipes 12 and 14 are equal and the hood 4c and displacing device 9 occupy their lowermost positions; the displacing device being submerged in the liquid 11c. When there is flow in the conduit, the pressure communicated through the pipe 12 is greater than the pressure communicated through the pipe 14, and raises the hood 4c and displacing device 9c, with a consequent fall in the level of the mercury 11c proportional to the functional relation between the differential pressure and the velocity of fluid in the conduit. The resultant of the opposing forces acting on the members 4c and 9c result in a movement thereof directly proportional to the velocity or volume of flow, and such movement may be communicated to suitable indicating, registering and recording mechanisms through the shaft 8 as indicated in my previous patents.

Having described my invention, I claim:

1. A fluid meter comprising a casing containing a pool of liquid heavier than the fluid to be measured, means forming a channel containing a pool of liquid heavier than the fluid to be measured, the bottom of one of said pools being above the top of the other of said pools, a hood vertically movable in and sealed by one of said pools, a displacing device shaped in accordance with the functional relation between the differential head and flow of a fluid to be measured and movable vertically in the other of said pools, and a connector positioning in vertical alignment the vertical axes of said hood and displacing device, the movement of said hood being regulated by said displacing device.

2. A fluid meter comprising a casing containing a pool of liquid heavier than the fluid to be measured, means forming an annular channel containing a pool of liquid heavier than the fluid to be measured, the inner edge of said last named pool being within the outer edge of said first named pool, a hood movable vertically in said second named pool and sealed thereby, a displacing device shaped in accordance with the functional relation between the differential pressure and flow of a fluid to be measured and movable vertically in said first named pool, and a connector transmitting movement from said hood to said displacing device and vertically aligning the vertical axes of said hood and displacing device.

3. A fluid meter comprising a casing containing a pool of liquid heavier than the fluid to be measured, a partition forming a channel containing a pool of liquid heavier than the fluid to be measured, a hood movable vertically in and sealed by one of said pools, a displacing device shaped in accordance with the functional relation between the differential pressure and flow of a fluid to be measured and movable vertically in the other of said pools, and a member connecting said hood and displacing device with their vertical axes in vertical alignment and with the bottom of one above the top of the other.

In testimony whereof I have hereunto set my name this 18th day of December 1928.

JOHN W. LEDOUX.